United States Patent [19]

Paramythioti et al.

[11] 4,264,851
[45] Apr. 28, 1981

[54] SYSTEM FOR CONTROLLING THE DIRECTION AND SPEED OF A STEERABLE LOCOMOTIVE

[75] Inventors: Michel Paramythioti, Lamorlaye; François Degraeve, Pont Ste-Maxence, both of France

[73] Assignee: Albaret S.A., Rantigny, France

[21] Appl. No.: 68,388

[22] Filed: Aug. 21, 1979

[30] Foreign Application Priority Data

Aug. 25, 1978 [FR] France ................. 78 24656

[51] Int. Cl.³ .................. G05D 1/00; B60K 17/10
[52] U.S. Cl. .................. 318/587; 318/663; 180/6.28
[58] Field of Search ............ 318/587, 663, 257; 180/6.24, 6.26, 6.28, 6.3

[56] References Cited

U.S. PATENT DOCUMENTS

| | | | |
|---|---|---|---|
| 3,720,281 | 3/1973 | Frownfelter | 318/587 X |
| 4,031,442 | 6/1977 | Poppelreiter | 318/663 X |
| 4,077,490 | 3/1978 | Casterton et al. | 180/6.3 |
| 4,191,913 | 3/1980 | Arnold et al. | 318/663 X |

FOREIGN PATENT DOCUMENTS

| | | | |
|---|---|---|---|
| 2338889 | 2/1975 | Fed. Rep. of Germany | 318/587 |
| 2752167 | 6/1979 | Fed. Rep. of Germany | 318/587 |

*Primary Examiner*—B. Dobeck
*Attorney, Agent, or Firm*—Charles E. Brown

[57] ABSTRACT

A direction and speed control system for a steerable locomotive having independent speed controls for two driving rollers, in which, where $C_D$ and $C_G$ are speed control signals for the two rollers, $\alpha$ is a steering angle of a steerable support, which may be a mere skid or a driving roller and $C_{max}$ is a maximum speed control value, there are three operational networks which generate signals $F_1$, $F_2$ and $F_3$ given by $C(1-K_1 \tan \alpha)$, $C(1+K_1 \tan \alpha)$ and $C_{max}(1-K_1|\tan \alpha|)/(1+K_1|\tan \alpha|)$, comparators which receive $C_{max}$ and $F_1$ and $C_{max}$ and $F_2$ respectively and output terminals fed in parallel, through gating circuits controlled by the comparators, by the first and third networks and by the second and third networks respectively.

11 Claims, 5 Drawing Figures

SYSTEM FOR CONTROLLING THE DIRECTION AND SPEED OF A STEERABLE LOCOMOTIVE

BACKGROUND OF THE INVENTION

The present invention relates generally to the control of the direction and speed of a locomotive which bears on the ground, on the one hand, with a bogie formed by at least two independent driving rollers or bogie members and, on the other hand, with a support assembly, if necessary reduced to a single steerable support member.

The invention concerns in particular, but not necessarily exclusively, compacting locomotives with hydrostatic transmission, for example compacting locomotives whose roller members constitute the vibrating elements and each of which is individually rotated by a respective independent hydraulic motor, such as are described in particular in French Pat. No. 1,573,169, and also in French Pat. filed under No. 7507655 and published under No. 2,323,543.

One of the problems to be overcome in the construction of locomotives of this type is to ensure complete independence between the speed control and the directional control, whatever steering angle is applied to the support member. In French Pat. No. 1,573,169 there is described a mechanical solution to this problem when the support member is a simple guide such as a freely rotating roller. In French Pat. No. 75,076,55 this mechanical solution is extended to the case in which the roller constituting the support not only guides but also drives. This mechanical solution has given and still gives satisfaction, but has disadvantages which are as follows.

First, the independence of the speed control of the locomotive with respect to its directional control is only brought about to the extent that in a bend the speed of rotation of that driving member situated outermost in this bend remains below a maximum speed value corresponding to the maximum output from the pump supplying the motor which controls it: above this maximum speed value the speed of rotation of that driving roller situated innermost in the bend decreases rapidly, in such a way that the direction followed by the locomotive, which direction is imposed by the relative speeds of rotation of the driving roller members of this latter, remains consistent with the steering angle applied, moreover, to the ground support of this locomotive.

As the speed of rotation of the inner driving roller situated innermost thus decreases, whereas that of the outer driving roller reaches its maximum value, the mean speed of forward movement of the locomotive decreases automatically, which in practice results in an automatic return of the speed-control lever of this locomotive.

When the locomotive returns to a straight line, this lever is thus no longer in its original position and the initially set speed of forward movement prevails no longer, it being necessary for the driver of the machine to operate this speed-control lever once more so as to regain this initial rate of forward movement.

Furthermore, the mechanical solution described in the aforementioned French patents essentially does not make it possible to obtain different directions of rotation at the two driving roller members and thus limits the steering angle which can be imparted to the steerable support.

SUMMARY OF THE INVENTION

The present invention relates to an electronic system designed to control the direction and speed of a locomotive of the type in question in such manner as to obviate the disadvantages briefly described above, this electronic system making possible in particular the constant maintenance of a mean speed of forward movement of the locomotive, whatever the deflection applied to its steerable support, and also making it possible to remove practically any limit for the corresponding steering angle, it being possible for the latter to reach substantially 90°.

Further objects, features and advantages of the invention will be apparent from the following description given by way of example with reference to the accompanying diagrammatic drawings.

DESCRIPTION OF THE PREFERRED EMBODIMENT

Figure 1:
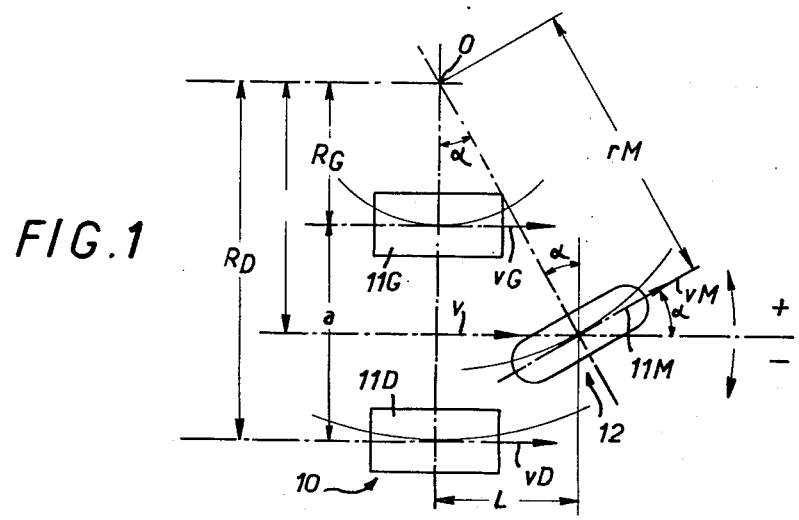
FIG. 1 is a plan view showing the wheel layout of a locomotive to which the invention may be applied.

In FIG. 1, the particular self-propelled locomotive has ground supports constituted by, first, a bogie 10 formed by two independent driving roller members 11D, 11G and, second, a support assembly 12 reduced to a single steerable support 11M.

Of course, the assemblies 10, 12 are staggered along the longitudinal axis of the locomotive and, in the embodiment illustrated, the support assembly 12 is shown to be positioned in front of the bogie 10 in relation to the normal direction of forward movement of the locomotive.

Furthermore, as illustrated, the steerable support 11M forming the assembly 12 is a roller; it could instead be a simple skid or runner. If it is a roller, it may be either a free running, or a driving member.

Finally, in the following it will be presumed that the self-propelled locomotive has hydrostatic transmission, i.e. the rotation of its rollers 11D, 11G is controlled by hydraulic motors each supplied individually by special pumps, and that, if the support 11M itself imparts drive, it likewise has such a motor.

Let it be supposed that:

$C_D$ be the displacement of the pump associated with the right-hand driving roller 11D;

$C_G$ be the displacement of the pump associated with the left-hand driving roller 11G;

and, if the support 11M imparts drive, $C_M$ is the displacement of the pump associated with this latter;

a be the width of the track of the locomotive the distance between the vertical centre-lines of the rollers 11D and 11G;

and L be the wheelbase of the locomotive i.e. the distance between the vertical plane passing through the axes of the rollers 11D and 11G and the vertical plane passing through the axis of its support 11M, in the central rest position of this latter.

It will now be assumed that a steering angle $\alpha$ is applied to the support 11M, in such a direction that the driving roller 11G is thus located innermost through the corresponding turn or bend. In these circumstances, let O be the centre of rotation of the locomotive for the steering angle $\alpha$;

$V_D$ be the speed of horizontal motion of the driving roller 11D;

$V_G$ be the speed of horizontal motion of the roller 11G;

$v_M$ be the speed of horizontal motion of the support 11M;

$R_D$ be the radius of curvature described by the driving roller 11D;

$R_G$ be the radius of curvature described by the driving roller 11G;

and $r_M$ be the radius of curvature described by the support 11M.

By construction it is possible to write the following equations:

$$V_D = K \cdot C_D \text{ and } V_G = K \cdot C_G$$

where K is defined by the speed of rotation of the pumps in question, the capacity of the motors which they supply and the diameter of the rollers driven thereby.

Now, according to FIG. 1:

$$R_D/R_G = V_D/V_G \text{ and therefore } R_D/R_G = C_D/C_G.$$

It is also possible to write the following equations:

$$(R_D - R_G) = a \text{ and } (R_D + R_G)/2 = R,$$

wherein the radius R is that of the mean turning circle of the locomotive. In order that the radius R might correspond to the steering angle $\alpha$ applied to the support 11M, it is necessary that:

$$\tan \alpha = L/R = 2L/(R_D + R_G)$$

Then, taking into account the preceding equations $$\tan \alpha = (2L/a)(C_D - C_G)/(C_D + C_G)$$

In addition, it is possible to deduce the following equation from FIG. 1:

$$r_M = R/\cos \alpha$$

and therefore, taking the preceding equations into account, $$r_M = (R_D + R_G)/2 \cos \alpha \text{ and } v_M = (V_D + V_G)/2 \cos \alpha$$

Because V is the average speed of forward movement of the locomotive it is possible to write:

$$V = (V_D + V_G)/2$$

Therefore, if C denotes the mean displacement of the pumps associated with the driving rollers 11D and 11G required to provide this average speed V, it is possible to write:

$$C = (C_D + C_G)/2$$

From these various equations it is possible to deduce the following equations:

$$C_D = C(1 + a \tan \alpha/2L)$$

$$C_G = C(1 - a \tan \alpha/2L)$$

and if the support 11M imparts drive:

$$C_M = K_2(C_D + C_G)/2 \cos \alpha$$

Therefore two cases are to be considered.

First case: the displacements $C_D$ and $C_G$ both remain below their maximum value $C_{max}$ or, in other words, the displacement $C_D$, which is the greatest for the turn in question, stays below this maximum value whatever the steering angle corresponding to this turn.

The values to be maintained for the displacements $C_D$, $C_G$ and $C_M$ are thus those given by the aforementioned equations.

Second case: during the turn or bend, for which it will be assumed by hypothesis that the steering angle measured from the longitudinal axis of the machine in question is positive, the value of the displacement $C_D$ may reach the maximum value $C_{max}$.

In this case, for greater steering angles, it is necessary, when the displacement $C_D$ reaches $C_{max}$, to reduce temporarily the means displacement C and, threfore, to reduce the displacements $C_G$ and $C_M$.

The equations to be observed then become the following:

$$C_D = C_{max}; \text{ and}$$

$$C_G = C_{max}(1 - a \tan \alpha/2L)/(1 + a \tan \alpha/2L),$$

$C_M$, expressed as $C_D$ and $C_G$, keeping the same value as above.

Similarly, if the steering angle is now assumed to be negative, i.e. assuming that through the corresponding turn it is the driving roller member 11D which is situated innermost, the preceding equations become, in similar manner, $$C_D = C_{max}(1 - a \cdot |\tan \alpha|/2L)/(1 + a \cdot |\tan \alpha|/2L);$$

and $$C_G = C_{max}$$

In other words, if in the course of a turn the displacement of the pump associated with either of the driving roller members 11D, 11G exceeds $C_{max}$, it is necessary for the following equations to be observed:

$$C_D(\text{or } C_G) = C_{max}$$

$$C_G(\text{or } C_D) = C_{max}(1 - K_1|\tan \alpha|)/(1 + K_1|\tan \alpha|)$$

$$C_M = K_2(C_D + C_G)/2 \cos \alpha$$

The present invention has as its subject-matter an electronic system which enables these requirements to be met.

Figure 2:
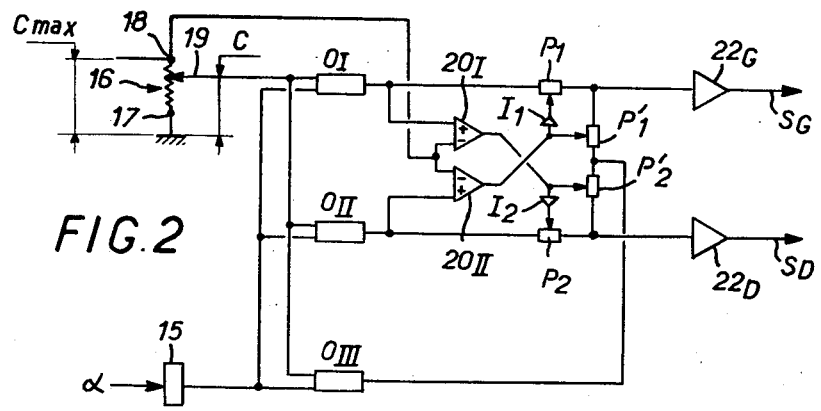
FIG. 2 is a block diagram of a speed and control system, according to the invention, for such a locomotive, in the case in which its support member does not impart drive.

Generally and as illustrated by the diagram in FIG. 2, this system comprises the displacements $C_D$, $C_G$, $C_M$ and $C_{max}$ corresponding to speed controls, an input pick-up 15 responsive to a value associated with the steering angle $\alpha$, a display potentiometer 16 of which one terminal 17 is connected to earth. To the other terminal 18 is applied a voltage corresponding to the value of the maximum speed $C_{max}$. The slider 19 of the potentiometer is calibrated to indicate a set or rated voltage corresponding to the mean commanded speed C. A first operational network $O_I$ is fed by the display potentiometer 16 and the input pick-up 15 and is capable of generating the signal: $C(1-K_1 \tan \alpha)$, called hereinafter $F_1$.

A second operational network $O_{II}$ is fed by the display potentiometer 16 and the input pick-up 15 and is capable of generating the signal $C(1+K_1 \tan \alpha)$, called hereinafter $F_2$.

A third operational network $O_{III}$ is fed by the display potentiometer 16 and the input pick-up 15 and is capable of generating the signal $C_{max}(131 K_1|\tan \alpha|)/(1+K_1|\tan \alpha|)$, called hereinafter $F_3$.

The outputs $S_D$, $S_G$ are capable respectively of supplying the speed controls $C_D$ and $C_G$. A first comparator $20_I$ receives inputs of the maximum command speed $C_{max}$ and the function $F_1$. A second comparator $20_{II}$ receives inputs of $C_{max}$ and the signal $F_2$. The networks $O_I$ and $O_{II}$ are coupled to the outputs $S_D$ and $S_G$ respectively, each in parallel with the network $O_{III}$ and under the control of gates fed by said comparators.

For example, and as illustrated, the comparators $20_I$ and $20_{II}$ each constituted by an operational amplifier, the output voltage of which swings from the low level to the high level if the potential present at the positive input is higher than that present at the negative input, and they receive the maximum speed-control value $C_{max}$ at their negative inputs.

In practice, and as illustrated, the network $O_I$ is connected to the output $S_G$ via, first, a gate P1 fed by the comparator $20_{II}$ through an inverter I1 and also via an output amplifier $22_G$. Similarly, the network $O_{II}$ is connected to the output $S_D$ via a gate P2 fed by the comparator $20_{II}$ through an inverter I1 and also by means of an input amplifier $22_D$. The network $O_{III}$ is connected to the input of the amplifier $22_G$ by a gate P'1, which is directly fed by the comparator $20_{II}$, and to the input of the amplifier $22_G$ by a gate P'2 which is directly fed by the comparator $20_I$. Each gate P1, P'1, P2 or P'2 is open if the potential at its control terminal is "high" and is closed if the potential is "low".

The driver of the locomotive has to set the slider 19 of the display potentiometer 17 at the voltage corresponding to the mean control speed C.

While the locomotive advances in a straight line the speed controls $C_D$ and $C_G$ supplied at the outputs $S_D$ and $S_G$ remain equal and they are supplied directly thereto by the networks $O_I$ and $O_{II}$: the gates P1, P2 are open and the gates P'1 and P'2 are closed.

As soon as a steering angle $\alpha$ is applied to the support 11M, the speed controls $C_D$,$C_G$ supplied to the outputs $S_D$,$S_G$ become different under the control of networks $O_I$ and $O_{II}$.

As long as the voltage supplied by the network $O_{II}$ stays below the voltage corresponding to $C_{max}$, i.e. taking into account the steering angle, as long as the output from the pump feeding the motor which controls the roller 11D, which is assumed to be outermost through the corresponding turn, stays below its maximum value, the comparator $20_{II}$ does not switch: the gate P1 remains open and the gate P'1 remains closed.

If, on the contrary, the steering angle $\alpha$ is such that the voltage generated by the network $O_{II}$ exceeds the voltage corresponding to $C_{max}$ the comparator $20_{II}$ switches: the gate P1 is closed and the gate P'1 is opened.

Therefore, it is the network $O_{III}$ which in place of the network $O_I$ supplies to the amplifier $22_G$ the speed control $C_G$ intended for the output $S_G$, in accordance with function $F_3$, whilst the speed control $C_D$ supplied to the output $S_D$ is saturated with the maximum speed signal $C_{max}$ by the output amplifier $22_D$. The conditions to be met in this case for the speed controls are thus ensured. In particular the average speed of forward movement of the machine is reduced. This condition prevails as long as the steering angle $\alpha$ which instigated it is maintained.

As soon as the steering angle $\alpha$ is reduced to a value which is sufficient to ensure that the voltage supplied by the network $O_{II}$ once more becomes less than that corresponding to the maximum speed $C_{max}$ and a fortiori, if this steering angle is cancelled, the networks $O_I$ and $O_{II}$ automatically provide the signals $C_D$ and $C_G$ for the outputs $S_D$ and $S_G$ and the vehicle thus automatically regains the average speed of forward movement V corresponding to the indicated speed C.

In the foregoing it has been assumed that the steering angle $\alpha$ was positive, the roller 11D in this case being outermost through the corresponding turn. However, if the steering angle is negative, in which case the roller 11G is then outermost through the corresponding turn, it is obviously the comparator $20_I$ which operates if necessary and thus causes the closing of the gate P2 and the opening of the gate P'2, in accordance with the foregoing.

Figure 3:
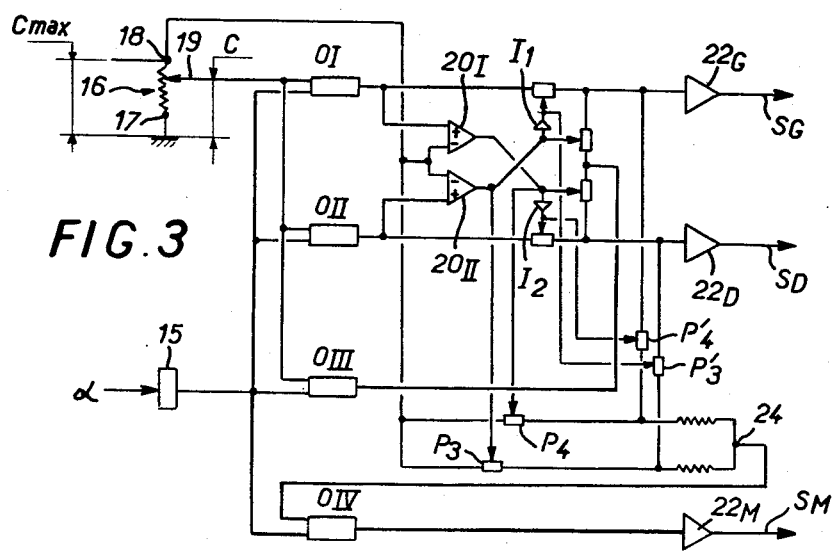
FIG. 3 is a block diagram similar to that in FIG. 2, for the case in which the support member for the locomotive imparts drive.

In the description of FIG. 2 it was assumed that the support 11M was free-running; FIG. 3 illustrates the application of the invention to the case in which the support 11M is driving.

For this case there is a fourth network $O_{IV}$ which is fed by the input pick-up 15 responsive to a value associated with the steering angle $\alpha$ and which also receives a voltage associated with the mean of the speed controls $C_D$ and $C_G$. This fourth network generates the signal $F_{IV}$.

$$C_M = K_2(C_D + C_G)/2 \cos \alpha$$

By means of an output amplifier $22_M$ the network $O_{IV}$ is connected to an output terminal for supplying the desired speed control signal $C_M$.

In practice, and as illustrated, the network $O_{IV}$ receives a voltage corresponding to the mean of the speed control signals $C_D$ and $C_G$ from a junction 24 at the midpoint of a voltage adder which is connected either to the terminal 18 by a gate P3 controlled by the comparator $20_{II}$, or to the input of the output amplifier $22_D$ by a gate P3 controlled by the comparator $20_{II}$ through the inverter I1 and is also connected either to the terminal 18 by a gate P4 controlled directly by the comparator $20_I$, or to the input of the output amplifier $22_G$ by a gate P'4 controlled by the comparator $20_I$ through the inverter I2.

When both of the speed control signals $C_D$ and $C_G$ are less than $C_{max}$ the gates P3 and P4 are closed, whereas the gates P'3 and P'4 are open. In this case the junction 24 receives the speed control signals $C_D$ and $C_G$. However, if the speed control signal $C_D$, for example, exceeds $C_{max}$ the comparator $20_{II}$ opens the gate P3 and closes the gate P'3, so that via the gate P3 the voltage corresponding to $C_{max}$ appears in place of that present at the input of the terminal output amplifier $22_D$, i.e. in place of the speed control signal $C_D$ whereas through the gate P'4 appears the speed control signal $C_G$.

The design of the comparators $20_I$ and $20_{II}$, of the gates P1, P'1, P2, P'2, P3, P'3, P4, P'4 and of the output amplifiers $22_D$, $22_G$ and $22_M$ will be obvious to those skilled in the art and will not be described in further detail. Although the same could apply to the operational networks $O_I$ to $O_{IV}$, and also to the input pick-up 15, one embodiment including these components is illustrated in FIG. 4 in which components already described are given the self-same reference numerals.

Figure 4:
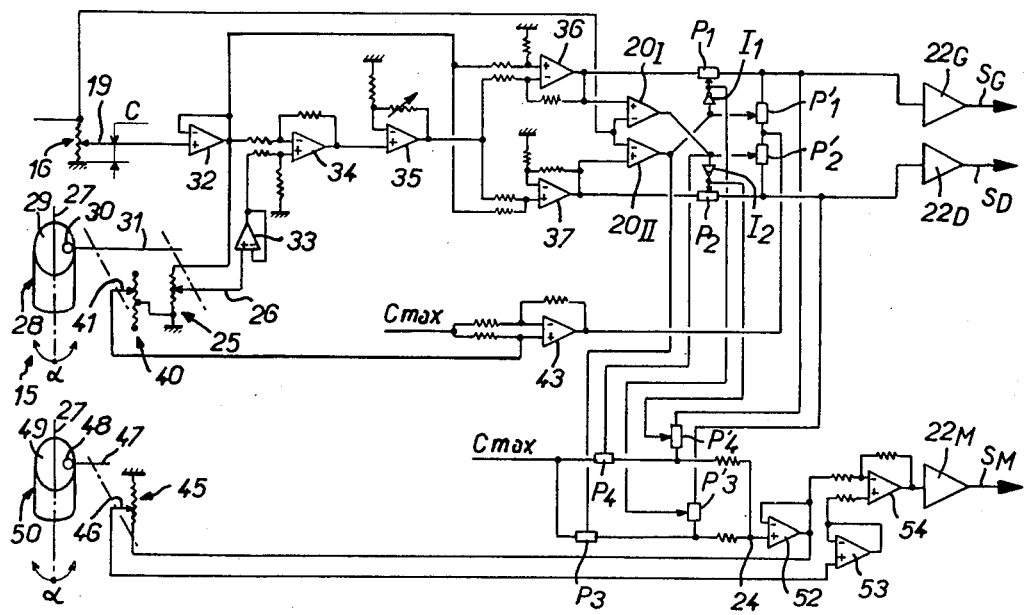
FIG. 4 is a detailed diagram of one embodiment of a control and speed system according to the invention.

In the embodiment illustrated in FIG. 4 the pick-up 15 comprises a potentiometer 25 whose slider 26 is controlled in movement by the support 11M in accordance with the tangent of the steering angle thereof.

For example, and as illustrated, this potentiometer 25 is of linear type and the support member 11M, which in FIG. 4 is represented by a vertical axis 27 enabling a steering angle to be applied thereto, acts on the slider 26 of this potentiometer by means of a cam 28 which is fixed to rotate on the axis 27 and whose track 29 follows a tangential law, the slider 26 of the potentiometer 25 being coupled by a transmission 27 to the roller 30 held in contact with this track.

Whatever the arrangement may be, one of the terminals of the potentiometer 25 is connected to earth, whereas a voltage is applied to the other terminal by means of an operational amplifier 32 disposed as a voltage-follower amplifier and thus simply forming an impedance changer, which voltage is taken at the slider 19 of the display potentiometer and corresponds to the mean speed-control value C to be maintained.

When the steering angle $\alpha$ is zero the slider 26 of the potentiometer 25 is in the middle position.

For any given positive or negative steering angle the cam 28 causes the angular displacement in one or other direction of this slider 26 and the voltage taken at the latter has the form $C(1+K'_1 \cdot \tan \alpha)/2$.

By means of an operational amplifier 33, disposed as a voltage-follower, this voltage is applied to one of the inputs of an operational amplifier 34 arranged as a subtractor, the output voltage of the amplifier 32 being applied to the other input thereof.

The voltage output of the amplifer 34 has the form $(C \cdot K'_1 \cdot \tan \alpha)/2$, and by means of an amplifier 35 this voltage is applied simultaneously to one of the inputs of an operational amplifier 36, arranged as a subtractor, and to one of the inputs of adding operational amplifier 37, the other input of each of these operational amplifiers receiving, moreover, the output voltage from the amplifier 32.

Thus the output voltage of the amplifier 36 has the form $C(1-K_1 \tan \alpha)$ and the voltage output of the amplifier 37 has the form $C(1+K_1 \tan \alpha)$.

The components described so far thus constitute the networks $O_I$ and $O_{II}$.

The output of the amplifier 36 is thus fed to the output amplifier $22_G$ by means of the gate P1 and to one of the inputs of the comparator $20_I$. The output of the amplifier 37 is fed to the output amplifier $22_D$ by way of the gate P2 and to one of the inputs of the comparator $20_{II}$.

In the illustrated embodiment the input pick-up 15 comprises a second linear potentiometer 40 whose midpoint is connected to earth and whose slider 41, like the slider 26 of the first potentiometer 25, is driven by the roller 30 subjected to the tangential cam 28.

Accordingly, at this slider there is picked up a voltage having the form $CK''_1 \tan \alpha$. This voltage is applied to one of the inputs of an operational amplifier 43 which, in accordance with a per se known differential bridge-connection, receives at one of its inputs a voltage such as this and at each of its inputs a voltage corresponding to $C_{max}$.

As result of the differential bridge-connection of this operational amplifier 43 and by a suitable choice of resistors there is at the output of this operational amplifier 43 a voltage having the form $C_{max}(1-K_1|\tan \alpha|)/(1+K_1|\tan \alpha|)$. The components which provide this voltage thus correspond to the network $O_{III}$. The voltage is applied to the control terminals of the gates P'1 and P'2.

In the illustrated embodiment, the input pick-up 15 comprises, finally, a third linear potentiometer 45 whose slider 46 is coupled by a transmission 47 to a roller 48 held in contact with the track 49 of a rotatively mounted "inverse cosine" cam 50 coupled rotatively to the axis 27 of the support member 11M. One of the terminals of this potentiometer 45 is connected to earth, whereas its other terminal receives, via an operational amplifier 52 disposed as a voltage-follower, the voltage obtained at the junction 24.

Accordingly, at the slider 46 there is obtained a voltage having the form:

$$(C_D+C_G) \cdot (1+K'_2/\cos \alpha)/2$$

By means of an operational amplifer 53, disposed as a voltage-follower, this voltage is applied to one of the inputs of an operational amplifier 54, disposed as a subtractor, and at the other input of which is applied the output voltage of the amplifier 52.

Thus at the output of the amplifier 54 there is picked up a voltage having the form:

$$(C_D+C_G) \cdot K_2/2 \cos \alpha$$

and this voltage is fed, by means of the output amplifier $22_M$ to the ouput $S_M$, the various component described above thus corresponding to the previously mentioned network $O_{IV}$.

Figure 5:
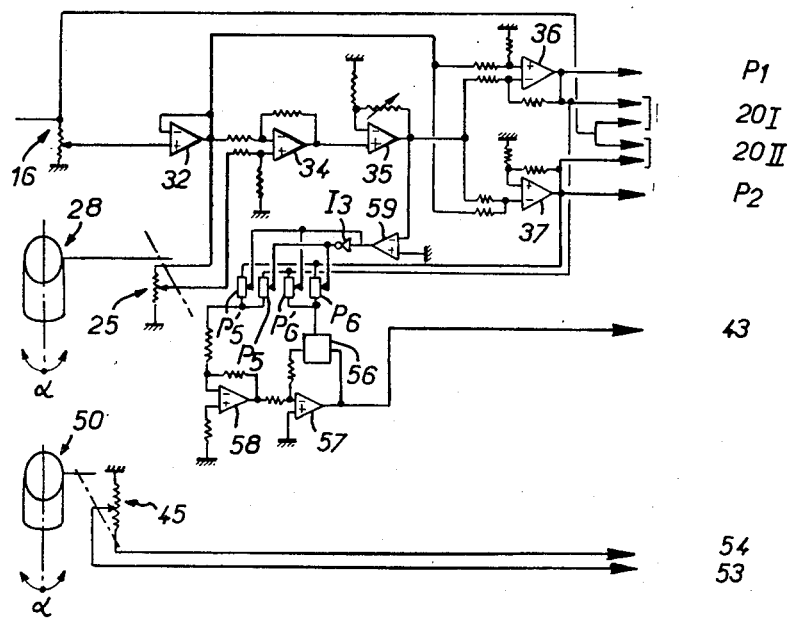
FIG. 5 is a diagram showing a portion of that in FIG. 4 and illustrates a modification thereof.

The modification illustrated in FIG. 5 makes it possible to omit the potentiometer 40.

According to this variant, the third network $O_{III}$ that required to obtain the function $F_3$, comprises, basically, a divider. A multiplier 56 is disposed in the negative-feedback loop of an operational amplifer 57, which is fed by an inverter amplifier 58 under the control of gates P5 and P'5. These gates are controlled by a comparator 59 responsive to the sign of the steering angle $\alpha$ and controls the first gate P5 by means of an inverter $I_3$ and the gate P'5 directly. Accordingly the amplifier 57 receives either the voltage supplied by the first network ($O_1$), taken at the output of the amplifier 36, or the voltage supplied by the second network ($O_{II}$) taken at the output of the amplifier 37. The other input of the amplifier 57 is grounded.

Under the control of gates P6, P'6, which are controlled directly and by way of an inverter $I_3$ respectively by the comparator 59, either the voltage supplied by the second network $O_{II}$, taken at the output of the amplifier 37, or the voltage supplied by the netqork $O_I$, taken at the output of the amplifier 36, is fed to the multiplier 56.

The use of such a dividing multiplier may also make it possible to do without the potentiometer 45, if desired, by employing certain basic trigonometrical equations for the processing of functions in $1/\cos \alpha$ and $\tan \alpha$ from $\tan(\alpha/2)$.

Similarly, the cams 28 and 50 may be omitted, if the potentiometers which they operate are provided with tracks formed directly in accordance, on the one hand, with a tangential law and, on the other hand, with a law $1/\cos \alpha$.

Furthermore, the present invention is not restricted to the forms of embodiment described and illustrated but covers all variants within the spirit of the claims.

In particular, it does not depend on the particular construction of the networks to be used, nor on that of the input pick-up.

In accordance with the value associated with the steering angle which is fed to them by such an input pick-up, it is sufficient for the networks in question to be capable of processing the various functions desired.

Moreover, with regard to the potentiometer 25 forming the input pick-up 15, instead of having one of its terminals connected to earth while its other terminal receives a voltage corresponding to the mean speed-control value C to be adhered to, such a potentiometer could have one of its terminals receiving a voltage such as this, whereas the other receives an inverse voltage by means of an operational amplifier installed as an inverter.

In this case the slider of such a potentiometer, which is of linear type, is in the central rest position when the steering angle $\alpha$ is zero.

Consequently, taking into account the arrangement used, there is thus taken directly at its slider a voltage proportional to $C \tan \alpha$, whose coefficient of proportionality is adjusted by an operational amplifier installed consecutively.

As previously, this voltage is then applied to operational amplifiers, one installed as a subtractor and the other as an adder, ahead of the comparators $20_I$ and $20_{II}$.

Similarly, the components 59, $I_3$, P5', P'5, P6', P'6 and 58 could be replaced by a unit receiving the absolute value of the expression $KC \tan \alpha$, reconstructing from the latter the expressions $C(1-|K \tan \alpha|)$ and $(1+|K \tan \alpha|)$ and supplying directly to these latter at 57 for one and 56 for the other.

Furthermore, the scope of the invention is not limited to the application of compacting machines with hydrostatic transmission, but extends to that of any self-propelled vehicle, at least one bogie of which comprises independent driving roller members, whether said driving members are controlled by a hydraulic motor or, for example, by an electric motor.

Moreover, such roller members may be caterpillar or track-type roller member and/or their number may be higher than two.

Finally, the provision of a support member is not absolutely necessary and, if provided, such a support member does not have to impart drive nor even have to be roller member.

We claim:

1. In a direction and speed control system for a steerable locomotive which is supported on the ground by means of a bogie, including at least two independent rotatable driving rollers, said system providing separate speed conrols $C_D$ and $C_G$ respectively, for each of said driving rollers, the combination comprising:

means for providing a signal denoting the steering angle $\alpha$ of said locomotive;

adjustable means for setting and indicating a mean speed control signal C;

means for providing a signal $C_{max}$ denoting a predetermined maximum speed;

a first operational network, responsive to the signal denoting steering angle and the mean speed control signal, for generating a signal $F_1$ given by $F_1 = C(1 - K_1 \tan \alpha)$;

a second operational network, responsive to the signal denoting steering angle and the mean speed control signal, for generating a signal $F_2$ given by $F_2 = C(1 + K_1 \tan \alpha)$;

a third operational network, responsive to the signal denoting steering angle and said signal denoting maximum speed, for generating at an output terminal a signal $F_3$ given by $F_3 = C_{max} (1 - K_1 \cdot |\tan \alpha|)/(1 + K_1 |\tan \alpha|)$;

a first comparator having input terminals, coupled to receive the said signal $F_1$ and said $C_{max}$ signal, and an output terminal;

a second comparator having input terminals, coupled to receive the said signal $F_2$ and said $C_{max}$ signal, and an output terminal; and respective output means for supplying said separate speed control, said output means being coupled to the output terminal of said third operational network in parallel with the output terminals of a respective one of said first and second operational networks; and gate means controlled by said comparators for controlling the coupling of said output means to the respective ones of said output terminals.

2. The combination set forth in claim 1, in which said adjustable means comprises a potentiometer having a slider, means for controlling said slider in accordance with the tangent of the steering angle and means for applying to said potentiometer a voltage corresponding to said mean control signal C.

3. The combination set forth in claim 2, in which said potentiometer has a linear characteristic and said means for controlling said slider comprises a cam coupled to said steerable support and disposed to displace said slider from a mid-point of said potentiometer in accordance with the tangent of said steering angle.

4. The combination set forth in claim 2, in which said potentiometer has a tangential function relating its output to the displacement of said slider.

5. The combination set forth in any one of claims 2, 3 and 4, in which said first and second operational network includes a subtractor and an adder respectively, said subtractor and adder each being disposed to receive said mean control signal C and said maximum speed signal $C_{max}$.

6. The combination set forth in claim 3, in which said third operational network comprises a differential bridge amplifier, which is coupled to receive as an input the maximum signal $C_{max}$ and to receive as another input the said maximum signal $C_{max}$ and a voltage at the slider of said potentiometer.

7. The combination set forth in claim 1 in which the third operational network comprises a divider.

8. The combination set forth in claim 1 in which the third operational network comprises an operational amplifier which includes a negative feedback loop, a multiplier disposed in said loop, a comparator responsive to the polarity of said steering angle, gating means controlled by the comparator to feed to the input of the operational amplifier either the signal $F_1$ or the signal $F_2$ selectively, and gating means controlled by said comparator to feed to said multiplier either the signal $F_2$ or the signal $F_1$ respectively.

9. The combination set forth in claim 1, further comprising a steerable support which is a driving member, and further comprising a fourth operational network for providing for said steerable support a speed control signal $C_M$ given by $C_M = (C_D + C_G) \cdot K_2/2 \cos \alpha$.

10. The combination set forth in claim 9, in which the fourth operational network comprises a subtractor, and further comprising a potentiometer disposed to receive said mean speed control signal and including a slider, and means responsive to said steerable support member for displacing the slider according to the cosine of said steering angle, said subtractor being coupled to means responsive to the mean of said speed controls $C_D$ and $C_G$ and to the slider of said potentiometer.

11. The combination set forth in claim 10 in which said means responsive to the mean of said speed control signals comprises comparator means coupled to said first and second operational networks, gate means coupled to said comparator means, and means including said gate means for selectively coupling to a junction point either the signal $F_1$ or the signal $C_{max}$ and either the signal $C_{max}$ or the signal $F_2$.

* * * * *